July 7, 1931.  D. M. BOOTHMAN ET AL  1,813,657
METHOD OF AND APPARATUS FOR SOLDERING
Filed Sept. 12, 1928

WITNESSES
INVENTORS
Dale M. Boothman
and James A. Cullerton
by Brown & Critchlow
Their attorneys.

Patented July 7, 1931

1,813,657

UNITED STATES PATENT OFFICE

DALE M. BOOTHMAN, OF OAKMONT, AND JAMES A. CULLERTON, OF NEW KENSINGTON, PENNSYLVANIA, ASSIGNORS TO ALUMINUM COMPANY OF AMERICA, OF PITTSBURGH, PENNSYLVANIA, A CORPORATION OF PENNSYLVANIA

METHOD OF AND APPARATUS FOR SOLDERING

Application filed September 12, 1928. Serial No. 305,593.

The invention relates to the production of soldered joints between an article comprising aluminum foil or thin sheet in pack form and another metallic part.

Because of its desirable properties, aluminum in the form of thin sheet or foil is being applied to many uses where formerly heavier and less desirable metals were used. Certain applications of these materials, however, require that they be used in the form of a pack composed of a plurality of layers, and that a metallic strip or similar part be soldered to the edge of the pack. Up to the present time it has not been possible to make commercially satisfactory joints of this nature, largely because the thinness of the foil or sheet, and the very small amount of metal exposed in each layer, increase considerably the known difficulty of satisfactorily tinning aluminum. Aluminum condensers comprising a pack or roll of foil interleaved with paraffined paper are an example of such an application. In soldering terminals to these condensers the paraffin tends to melt and to increase the difficulty of properly wetting the metal with solder. No means of which we are aware have been devised thus far by which metallic strips or similar parts may be satisfactorily soldered to articles comprising aluminum in such pack forms to produce sound joints quickly and easily and with the regularity demanded in commercial practice.

The objects of the invention are to provide a method of making a sound soldered joint between a metallic part and an article comprising aluminum foil in pack form, which satisfactorily overcomes prior disadvantages which attend this operation, which is rapid, simple, easily performed, and adapted to commercial practice; and also to provide a simple and effective apparatus for tinning aluminum parts of the type referred to and particularly adapted for practicing the method.

Figure 1:
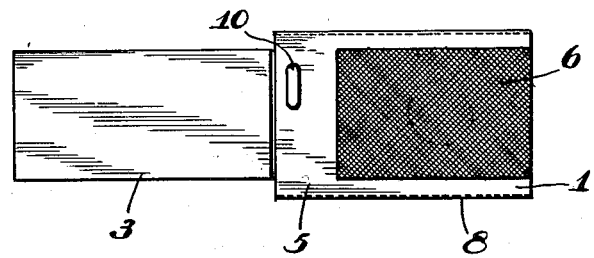
Figure 2:
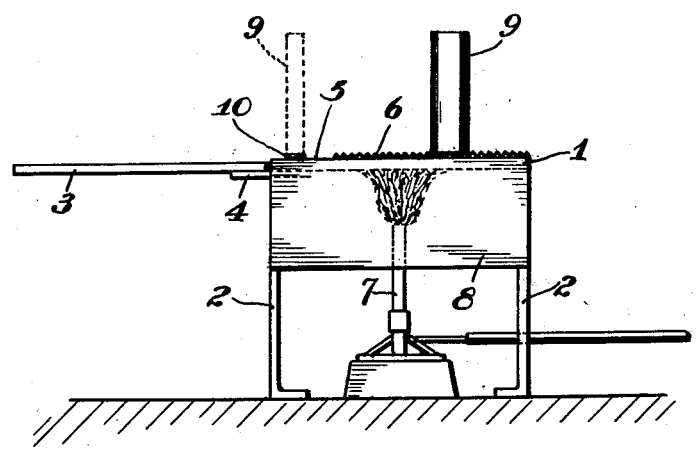

The method according to the invention may be performed with the apparatus shown in the accompanying drawings, in which Figs. 1 and 2 are a plan view and a side elevation, respectively, of the preferred embodiment.

The invention is predicated upon our discovery that satisfactory soldered joints between a pack of aluminum foil and a metallic strip or similar part, can be made quickly and easily, and with regularity, by tinning and preheating the strip, while tinning the previously unheated foil pack by rubbing it on a heated solder-carrying abrading surface, and forming the joint by firmly applying the tinned parts to one another. The joint thus produced is then cooled without materially disturbing contact between the parts, and preferably it is chilled suddenly.

In the specification and appended claims the term "tinning" is used in its general soldering significance to indicate the wetting of a metal by a film of solder which may or may not comprise tin or a tin-containing alloy.

Having reference now to the drawings, the apparatus may comprise a metallic heating plate 1 supported in any suitable manner, as by legs 2, and a cold joint-chilling plate 3 connected to plate 1, as by splice bars 4. Joint-chilling plate 3 and the contiguous portion of plate 1, indicated by the numeral 5, are plane surfaced, and the balance of the heating plate is provided with an abrading surface 6. This surface may assume a variety of forms, that shown being formed by cutting two intersecting series of parallel V-shaped notches in the body of the metal. This surface may, for purposes of description, be termed "scored", this term equally comprising other types of roughened surfaces adapted to abrade articles rubbed over it.

Plate 1 may be heated in any suitable manner, as by the flame from a gas burner 7 shielded by an apron 8 depending from and surrounding the plate. The heating plate is preferably made from copper because of its thermal properties, and because this metal is generally wetted by the solder, although other metals, which can be wetted by the solders used, may of course be substituted for copper. The joint-chilling plate, which remains cold, may be made from steel, aluminum, or other metal, a metal possessing high heat conductivity being preferred for this purpose.

In the use of this apparatus, plate 1 is heated to the proper temperature, depending upon the melting point of the solder, and the work to be done, and, when sufficiently heated, solder is applied to the scored portion in amount adapted to wet the surface and maintain an excess thereon. The metallic strip, either tinned or untinned, is placed on preheating portion 5, where it reaches the plate temperature. The strip may be tinned prior to preheating, as by dipping in a pot of molten solder, or it may be tinned during the heating. During this time the end of the foil pack to which the strip is to be soldered is placed on the abrading surface 6 and quickly and vigorously rubbed thereon, whereby the metal is abraded and simultaneously tinned. The tinned edge is now firmly pressed against the tinned surface of the preheated strip, which is securely backed by the plane surface on which it rests. The joint thus formed is then preferably moved to cold plate 3, to chill it and complete the operation. In order to prevent material disturbance of the contact between the parts when being transferred from one plate to the other, plate 3 is preferably disposed slightly below the level of the preheating surface, whereby the joints can be slid readily upon the chilling plate.

As further descriptive of the application of the process and use of the apparatus, there may be described the soldering of a metallic terminal to an aluminum condenser of the type hereinabove referred to. This example is fully characteristic of the type of soldering contemplated by the invention, and presents difficulties which have thus far substantially prevented the use of aluminum in the production of foil condensers.

In making this condenser joint it is preferred to use a solder composed of about 60% zinc and 40% cadmium, which is best used at a temperature of about 340° C. When plate 1 has been heated and provided with the solder, a terminal strip 10, composed of copper, aluminum or another suitable metal, is tinned and placed on preheating portion 5 of the hot plate to bring it to or maintain it at the plate temperature. The end of a condenser 9 is now rubbed firmly but rapidly on the scored solder-applying surface 6, this operation being performed quickly so that the heating of the metal is incipient and confined to the portion in contact with the plate. The localized heat and abrasion produce the necessary tinning, while material fusion of the paraffin is avoided. The tinned condenser end is now promptly placed against the tinned preheated terminal, as shown in dotted lines in Fig. 2, and the entire joint is slid onto cold plate 3 to chill the joint and complete the operation.

The invention makes it possible to produce sound joints which could not be previously made in any practicable manner, they may be made quickly and easily, without any of the difficulties which have hitherto prevailed, and under commercially feasible conditions.

According to the provisions of the patent statutes, we have explained the principle and mode of operation of our invention, and have illustrated and described what we now consider to be its preferred embodiment. However, we desire to have it understood that, within the scope of the appended claims, the invention may be practiced otherwise than as specifically illustrated and described.

We claim:

1. An apparatus for making a soldered joint between two metallic parts, one of which comprises aluminum foil in pack form, comprising a metallic hot plate having a plane-surfaced portion for preheating one of the parts, and a solder-applying scored-surface portion for abrading and simultaneously wetting the aluminum foil part with solder.

2. An apparatus for soldering two metallic parts of which one is composed of aluminum foil in pack form, comprising a heated metallic soldering plate provided with a solder-applying scored-surface portion for abrading and simultaneously wetting the aluminum part with solder, and having a plane-surfaced portion for preheating the other part, and means for rapidly chilling the joint between the parts.

3. An apparatus for soldering two metallic parts of which one comprises aluminum foil in pack form, comprising a heated solder-applying plate, and a cold joint-chilling plate connected thereto, said solder-applying plate having a solder-carrying scored-surface portion for abrading and simultaneously wetting the aluminum foil part with solder, and having a plane-surfaced portion for preheating the other part and supporting it for contact with the abrasively tinned aluminum foil part, the cold plate being adapted to receive and chill the joint without material disturbance thereof.

4. The method of soldering a metallic terminal to the end of a condenser formed from aluminum foil interleaved with paraffined paper, comprising tinning and preheating the terminal to soldering temperature, tinning the condenser end to which the terminal is to be attached by rapid rubbing on a heated solder-carrying scored surface to abrade and simultaneously wet said end with solder without materially melting said paraffin, applying the tinned surfaces to one another, and without materially disturbing the contact between said surfaces chilling the joint by contact with a cold surface.

In testimony whereof, we hereunto sign our names.

DALE M. BOOTHMAN.
JAMES A. CULLERTON.